Figure 5:
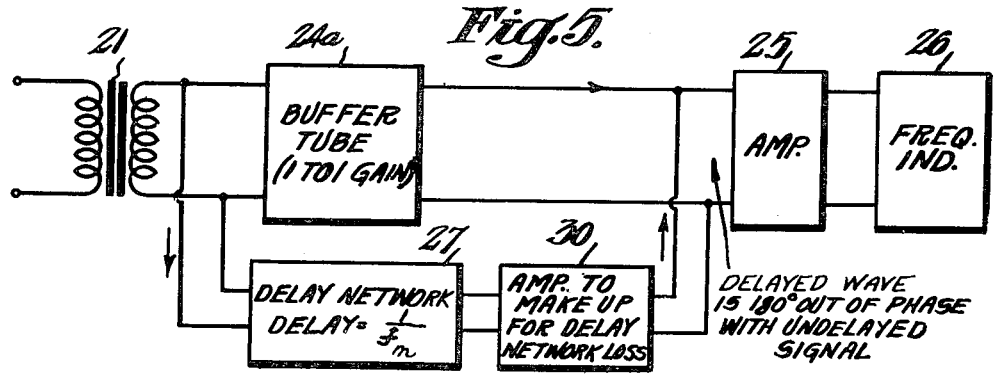

June 10, 1947.　　　R. C. SANDERS, JR　　　2,422,135
FREQUENCY MODULATED DISTANCE INDICATOR
Filed June 26, 1943　　　4 Sheets-Sheet 1
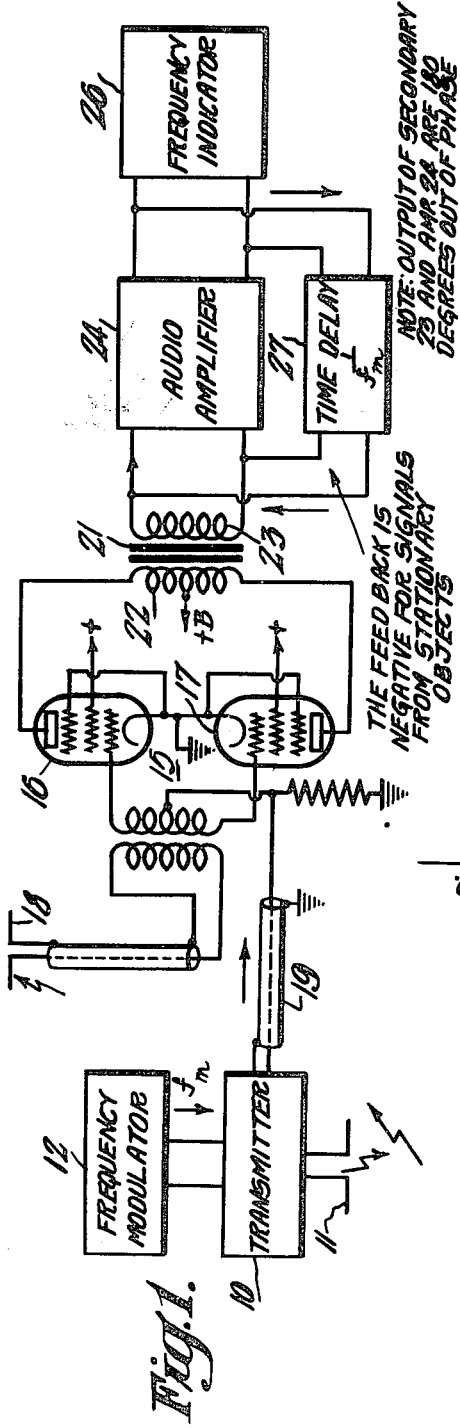
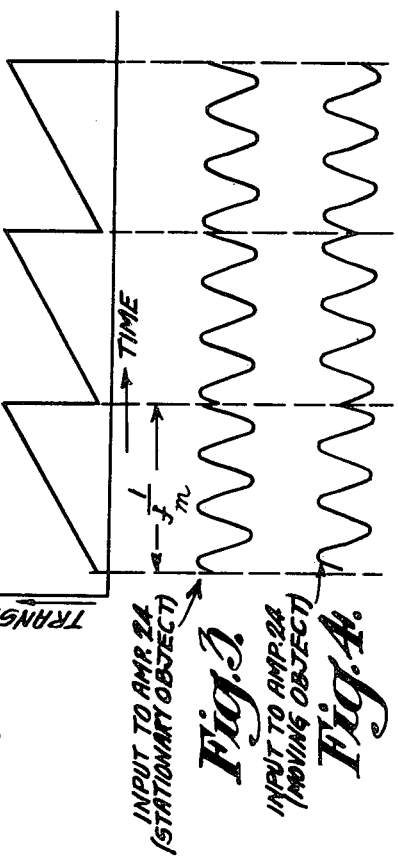
Inventor
Royden C. Sanders, Jr.
By
Attorney June 10, 1947.  R. C. SANDERS, JR  2,422,135
FREQUENCY MODULATED DISTANCE INDICATOR
Filed June 26, 1943  4 Sheets—Sheet 3

Inventor
Royden C. Sanders, Jr.
By
Attorney

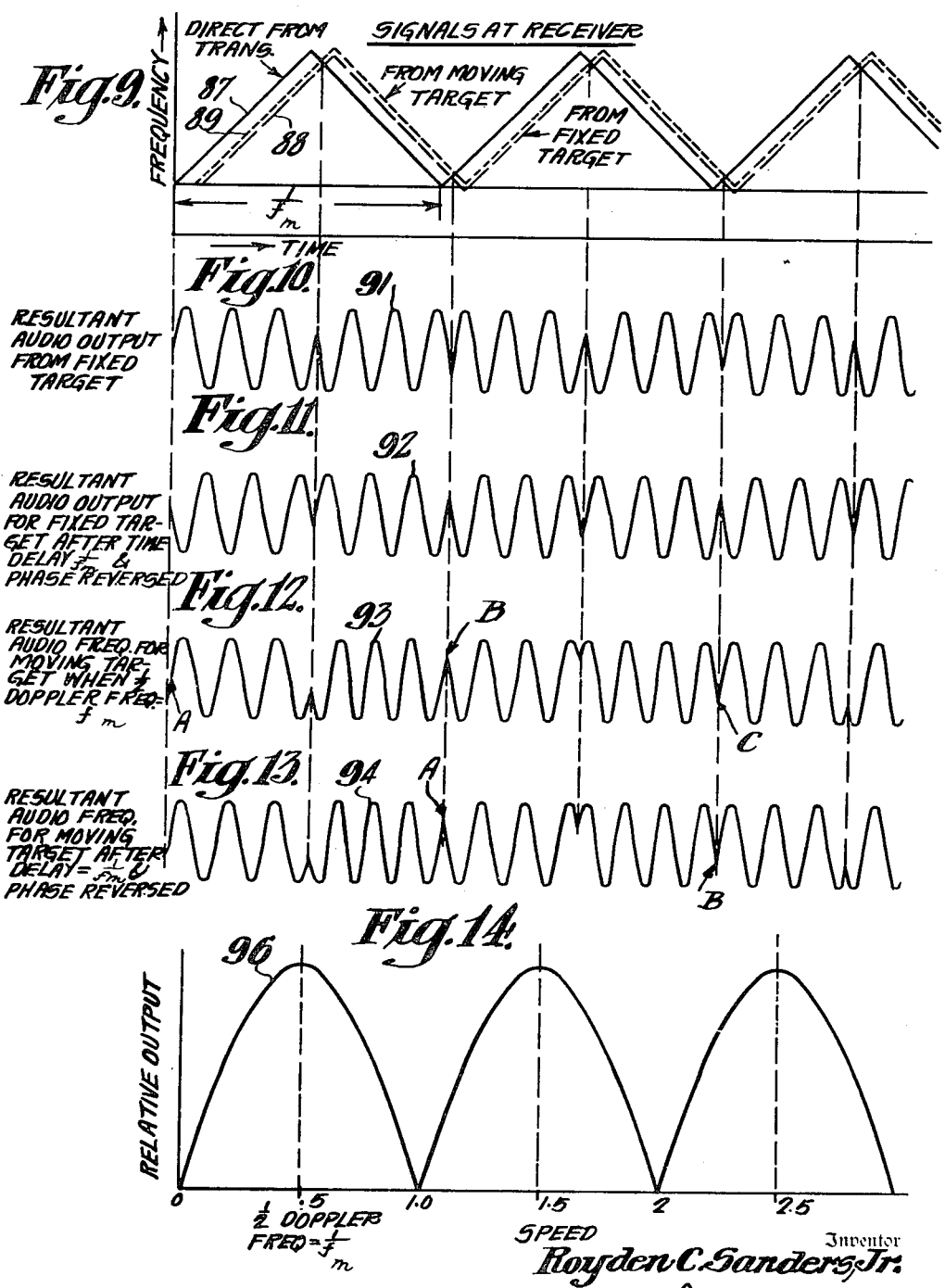

Patented June 10, 1947

2,422,135

UNITED STATES PATENT OFFICE 2,422,135

FREQUENCY MODULATED DISTANCE INDICATOR

Royden C. Sanders, Jr., Hightstown, N. J., assignor to Radio Corporation of America, a corporation of Delaware Application June 26, 1943, Serial No. 492,654

13 Claims. (Cl. 250—1.68)

My invention relates to radio systems such as radio distance indicating and object locating apparatus of the type utilizing reflected waves. It will be described particularly with respect to systems wherein the transmitted wave is cyclically frequency modulated.

Systems of this character are described in Bentley Patent 2,011,392 and Espenschied Patent 2,045,071. In these systems, the radiated frequency-modulated wave is reflected from the earth's surface or from an aircraft or other object to be located and the reflected wave is received by means including a heterodyne receiver located in the vicinity of the transmitter. The heterodyning or mixing signal for the receiver is obtained directly from the transmitter whereby the receiver output includes a signal of "beat frequency" which frequency is a function of the time required for the radiated signal to reach the reflecting object and return to the receiver.

It has been found that it is difficult to detect the approach of low flying aircraft by means of radio locator systems previously employed because of the strength and number of reflections from the ground and objects on the ground. The ground reflections may completely mask the reflected signal from the low flying aircraft. The same problem is encountered in any situation where it is desired to obtain usable signal from a fast moving object travelling close to stationary objects that reflect strong signals.

An object of the invention is to provide an improved system of the type utilizing reflected waves for detecting rapidly moving objects and for measuring the distance to such objects.

A further object of the invention is to provide an improved method of and means for indicating the approach of an aircraft travelling at a low altitude.

A still further object of the invention is to provide an improved frequency-modulated distance measuring system in which the signal output resulting from reflection from stationary objects is reduced with respect to the signal output resulting from the reflection from a rapidly moving object.

In a preferred embodiment of the invention, advantage is taken of the fact that the beat-frequency wave pattern of the receiver output resulting from reflection from a stationary object repeats at the modulating frequency $f_m$, that is, at the frequency at which the transmitted signal is cyclically swept through a certain frequency band. Because of this repetitive characteristic of the receiver output, it is possible to provide the receiver with a circuit in which a delay network or the like delays the beat-frequency signal the correct amount so that when it is combined with the undelayed beat-frequency signal, the beat-frequency signal that is produced during one frequency-modulation sweep is cancelled out or reduced in amplitude by the beat-frequency signal that was produced during the preceding frequency-modulation sweep, assuming the signal is due to reflection from a stationary object. In one preferred embodiment of the invention, the amount of time delay provided to obtain the desired cancellation is the period of one frequency-modulation sweep or a time delay equal to this period multiplied by an integer. If the reflecting object is moving rapidly, as in the case of an airplane, the beat-frequency signal produced by reflection therefrom starts at a different part of the cycle at the beginning of each frequency-modulation sweep, therefore this beat-frequency signal is not balanced out, and the only indication obtained is the one from the moving object.

Figure 6:
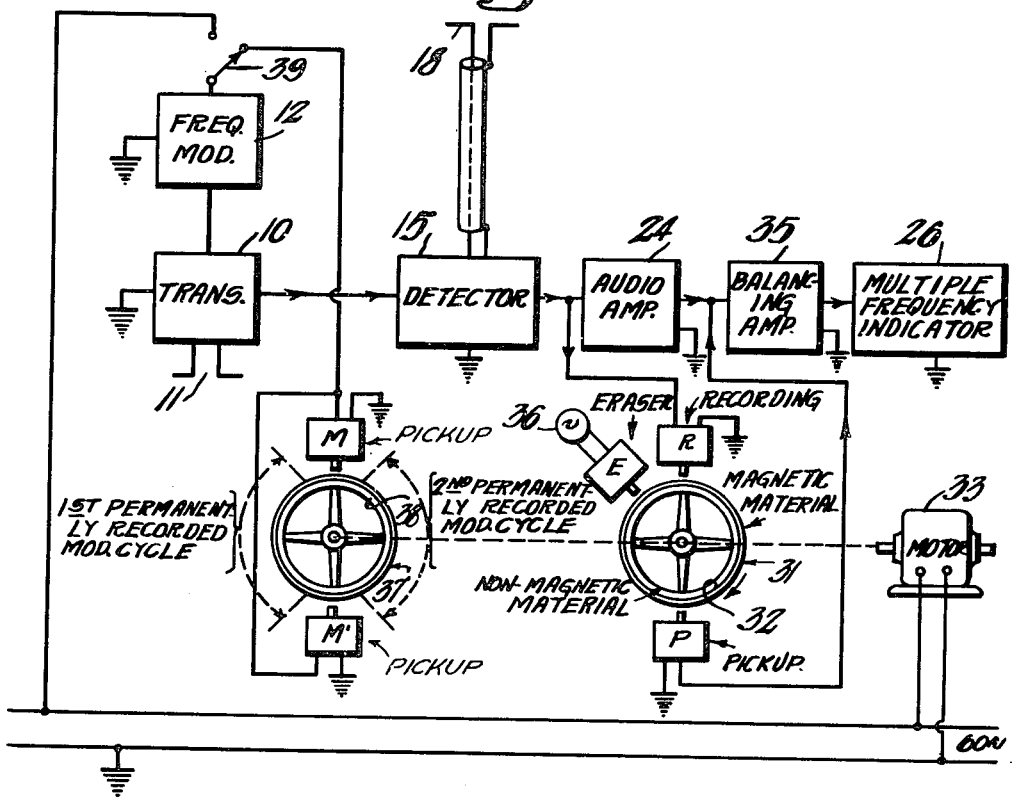
Figure 7:
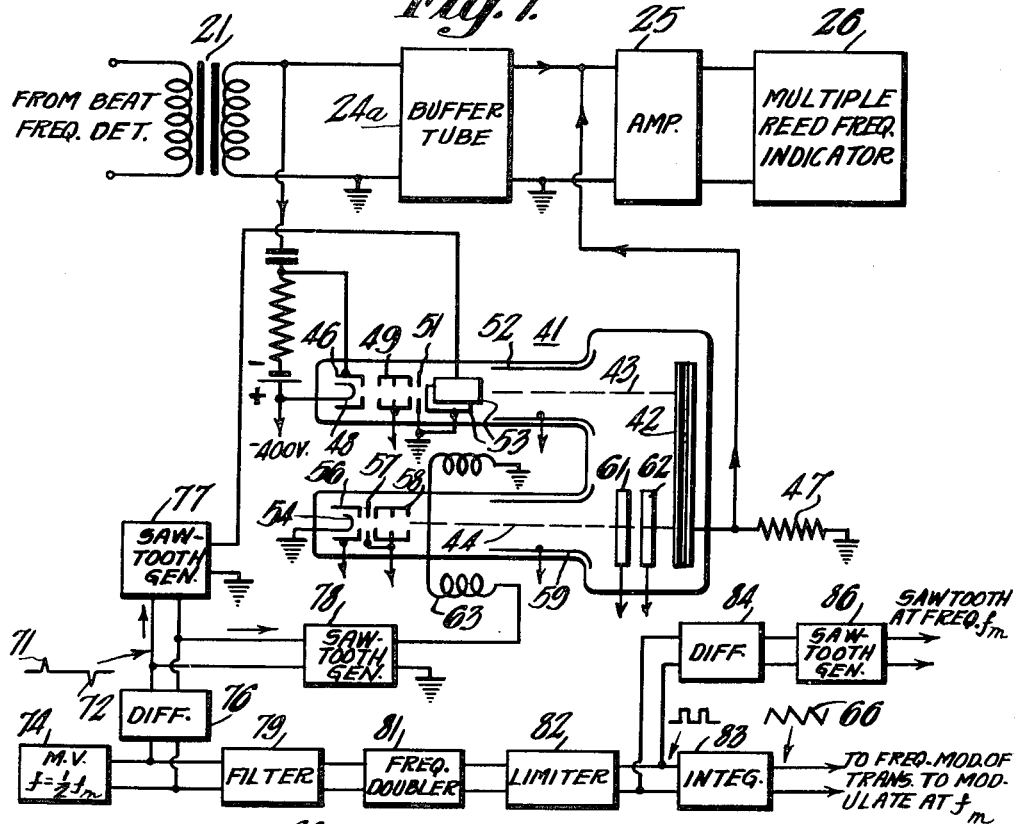
Figure 8:
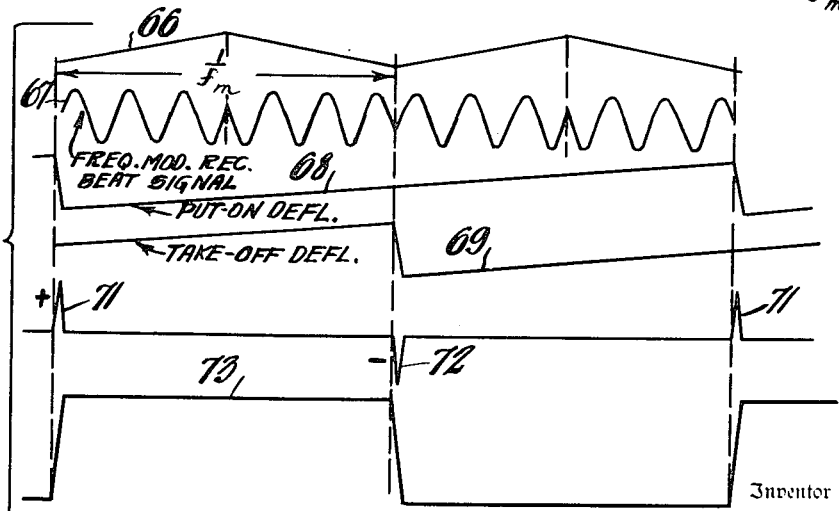

The invention will be better understood from the following description taken in connection with the accompanying drawing in which Figure 1 is a circuit diagram of a frequency-modulation distance indicator designed in accordance with one embodiment of the invention; Figure 2 is a graph illustrating the manner in which the transmitter is cyclically frequency modulated; Figures 3 and 4 are graphs illustrating the periodic or repetitive characteristic of the beat-frequency signal supplied to the audio or beat-frequency amplifier of Fig. 1 as a result of reflection from stationary and moving objects, respectively; Figures 5, 6 and 7 are block diagrams of other embodiments of the invention; Figure 8 is a group of graphs to which reference is made in explaining the invention; and Figures 9, 10, 11, 12, 13 and 14 are additional graphs to which reference is made in explaining the invention. In the several figures, similar parts are indicated by similar reference characters.

Referring to Fig. 1, the apparatus comprises a frequency modulated radio transmitter 10 having an antenna such as a dipole 11 which radiates a frequency-modulated signal toward the target or other reflecting object. Such a signal is produced by sweeping the frequency of the carrier wave of the transmitter 10 through a frequency band at the periodic rate $f_m$ whereby a cyclically frequency-modulated carrier wave is obtained. This may be done by means of a suitable frequency modulator 12, which in one simple form may comprise a motor-driven capacitor for varying the tuning of the transmitter oscillator as escribed in the above-mentioned Espenschied atent, or it may comprise a vibrating capacitor  the type described in Wolff and Sanders U. S. atent 2,257,830 or a reactance tube circuit.

The specific receiver, which will be described or the purpose of illustration, includes a heterodyne detector 15 comprising two vacuum tubes 3 and 17 connected in balanced relation. The reflected signal is picked up by an antenna such as a dipole 18 and applied in push-pull relation to the input circuits of the tubes 16 and 17. The eterodyning signal is applied in parallel relation from the transmitter 10 over a line 19 to the input circuits of the tubes 16 and 17, this signal corresponding to that radiated from antenna 11. The output circuit of the balanced detector includes a transformer 21 that has a center-tapped primary 22 and a secondary 23. Anode voltage is supplied from a suitable "B" supply (not shown) through the center tap and through opposite halves of the primary 22 to the anodes of tubes 16 and 17. The secondary 3 supplies the beat-frequency output signal to an audio frequency amplifier 24 and to a suitable frequency indicator 26. This indicator may be a frequency counter but it preferably is of a type that will indicate a plurality of targets. Such indicators are described and claimed in my copending application Serial No. 481,041, filed March 29, 1943, and entitled Distance indicator.

It may be noted that the balanced type of detector circuit described above is desirable for the purpose of balancing out any amplitude modulation that may be present. It is described and claimed in the application of Irving Wolff and Royden C. Sanders, Serial No. 445,010, filed May 29, 1942, and entitled Frequency modulated altimeter or distance indicator. Any amplitude modulation that may be present in mixing signal or in the reflected signal or any jamming signal is balanced out in the primary 22. The beat-frequency signal from tube 16 and the beat-frequency signal from tube 17 will add in the primary 22 and will appear across secondary 23 where it is impressed upon the audio amplifier 24. It should be understood that the invention is not limited to the use of this balanced type of receiver as any suitable receiver may be employed.

In accordance with one embodiment of the present invention, a negative feedback circuit is provided through a suitable delay network or other delay means 27 which preferably has a time delay equal to $1/f_m$ where $f_m$ is the frequency-modulation frequency. Various types of delay networks which are suitable for use in my invention are known in the art. Also, instead of electrical networks there may be employed delay devices of the acoustic type or of the magnetic recording type, for example. It will be apparent that if the beat-frequency signal fed back through the time delay device 27 is impressed upon the input circuit of audio amplifier 24 out of phase with the signal being received from the detector 16—17, there will be cancellation of the beat-frequency signals that have been produced by reflection from stationary objects.

The operation of the invention may be seen more clearly by referring to Figs. 2, 3 and 4. Fig. 2 illustrates the cyclic frequency modulation of the transmitter where the period of the frequency sweep is $1/f_m$. Any beat-frequency signal resulting from reflection from a stationary object will appear in the detector output circuit during each of these periodic frequency sweeps and will be repetitive in character as shown in Fig. 3. It will be noted that, assuming no change in the distance between the transmitter and the reflecting object, the beat-frequency signal at the beginning of each periodic sweep starts at the same point in the cycle. Thus it is possible to delay the beat-frequency signal by the time $1/f_m$ so that, at the audio amplifier input circuit, the beat-frequency signal produced during one frequency-modulation sweep will start at the same point in the cycle as the beat-frequency signal produced during the next occurring frequency-modulation sweep. To obtain signal cancellation, the delayed and undelayed signals are supplied 180 degrees out of phase at the input terminals of the amplifier, this, of course, being a negative feedback relation. Thus, signal indications from stationary objects are either cancelled out or greatly reduced in amplitude.

Fig. 4 represents a beat-frequency signal that is due to reflection from a rapidly moving object. In this case the delayed signal is not 180 degrees out of phase with the detector output signal and will not be cancelled out. In fact, at a certain speed of the object the two signals will actually be in phase, this being the condition for maximum response at the indicator.

It should be understood that the cyclic frequency modulation need not be in accordance with a sawtooth wave form (shown in Fig. 2) but, if preferred, may be in accordance with other wave shapes such as a sine wave or a triangular wave, for example.

Fig. 5 shows a form of the invention which is more readily adjusted or balanced for good operation than is the circuit of Fig. 1. Here the delayed signal is "fed forward" and combined 180 degrees out of phase with the undelayed signal from a buffer amplifier 24a. The amplifier 24a may be a cathode follower tube having a one-to-one gain. The two signals are combined in a suitable amplifier 25 where they are balanced out if they represent stationary objects. In order to make the two signals of equal amplitude at the amplifier 25, the attenuation loss introduced by the network 27 may be made up in an amplifier 30. Just as in Fig. 1, all signals reflected from stationary objects may be balanced out, and only indications from moving objects obtained.

Fig. 6 shows another embodiment of the invention in which the delayed signal is fed forward. In this embodiment, the desired delay is obtained by means of magnetic recording on a moving tape 31 of suitable magnetic material. The tape 31 may be carried by a wheel 32 of non-magnetic material which is driven by a motor 33.

The input signal of the audio amplifier 24 is recorded on the tape 31 by means of a magnetic recording element R. At the end of one-half a rotation of the tape 31 the same signal is taken off the tape by means of a pickup unit P and is supplied to the input circuit of a "balancing out" amplifier 35. After the tape 31 passes the pickup unit P, it is wiped off or erased by suitable means such as an erasing unit E supplied with alternating current from a source 36.

One way of making certain that the amount of delay always has the proper relation to the modulation cycle is to obtain the frequency-modulating signal from a moving tape 37 on which the modulating signal is permanently recorded, and to rotate this tape synchronously with the time delay tape 31. In the example shown, the tape 37 is carried by a non-magnetic wheel 38 which is mechanically coupled to the same shaft that is driving the delay tape 31. One cycle of the modulating signal is permanently recorded on each half of the tape 37 whereby there are two modulating cycles for each rotation of the wheel 38. The recorded signal on each half of the tape 37 may be of any desired wave form such as sawtooth, triangular or sinusoidal. The recorded signal may be taken off the tape by a single pickup unit M which supplies the modulating signal to the modulator 12 through a switch 39. If preferred, a second pickup unit M', located diametrically opposite the unit M, may be connected in parallel therewith for the purpose of making certain that successive modulation cycles are exactly alike even though there may be some irregularity in the recording.

It will be evident that when the time delay device and the frequency-modulating signal source are coupled mechanically as described, there is always the correct time delay to make the beat-frequency signal produced during one frequency-modulation sweep cancel the beat-frequency signal produced during the next occurring frequency-modulation sweep, assuming the reflecting object is stationary. In this specific embodiment of the invention, the motor 33 need not be of the synchronous type.

Instead of obtaining the frequency modulation by means of a permanent recording, the switch 39 may be moved to its other position to connect the frequency modulator 12 (a vibrating capacitor unit, for example) to the 60 cycle power line. Since the magnetic delay tape 31 is being driven by a synchronous motor, the delay period will always be synchronous with the frequency-modulation cycle. In this embodiment the motor 33 should be synchronous.

Fig. 7 illustrates the use of a cathode ray storage tube 41 for obtaining the desired delay $1/f_m$. The tube comprises a storage screen 42 which has a multiplicity of parallel strips of conducting material which is secondary electron emissive. Signal is put on the screen 42 by a high velocity electron beam indicated at 43 and is taken off by a low velocity electron beam indicated at 44. The beam 43 is modulated by the beat-frequency signal supplied through the transformer 21 to a control electrode 46 whereby the signal is stored on the screen 42. The same signal is taken off the screen 42 after a delay of $1/f_m$ by the beam 44 and supplied from an output resistor 47 to the amplifier 25 where signals representative of stationary objects are cancelled out as described in connection with Figs. 5 and 6.

The tube 41 is described and claimed in the copending application of Harley Iams, Albert Rose and Gardner L. Krieger, Serial No. 492,658, filed June 26, 1943, and entitled Cathode ray storage tube. Referring briefly to the electron gun structure of the tube, the high velocity beam gun comprises a cathode 48, the control electrode 46, a first anode 49, a second anode 51 and a secondary electron collector electrode 52. A pair of deflecting plates 53 are positioned in the tube for deflecting the electron beam vertically across the conducting strips of the screen 42.

The low velocity beam gun comprises a cathode 54, a control grid 56, a screen grid 57, a first anode 58 and a second anode 59. Frame-like or ring electrodes 61 and 62 are provided to slow down the electron beam as it approaches the storage screen 42. In the example illustrated, the signal taken off the screen 42 by the low velocity beam appears across the resistor 47 which is connected between the back plate of the screen 42 and ground. The vertical deflection of the low velocity beam may be obtained by means of a pair of deflecting coils 63.

Various circuits may be employed for deflecting the "take-off" beam 44 in delayed time with respect to the "put-on" beam 43. Before referring to one example of such circuits, reference will be made to Fig. 8. This figure shows the time relations between the frequency-modulation sweep (which may be triangular as shown by the graph 66), the beat-frequency signal shown by the graph 67, the sawtooth deflecting waves 68 and 69 for the "put-on" and "take-off" beams, respectively, the driving or synchronizing pulses 71 and 72 for producing the waves 68 and 69, respectively, and the rectangular wave 73 from which the pulses 71 and 72 are derived.

Referring again to Fig. 7, the wave 73 may be produced by a multivibrator 74 and supplied to a differentiating circuit 76 for producing the driving pulses 71 and 72. The positive pulses 71 drive a sawtooth generator 77 to produce the wave 68 for deflecting the "put-on" beam 43 while the negative pulses 72 drive a sawtooth generator 78 for producing the wave 69 for deflecting the "take-off" beam 44. It will be noted that the deflecting wave 69 is delayed with respect to the deflecting wave 68 by the time $1/f_m$ whereby there is a like delay between the input signal and the output signal of the tube 41.

The triangular frequency-modulating wave 66 for the transmitter may be produced by passing some of the output of the multivibrator 74 through a filter 79 to obtain a sine wave, doubling the frequency of the sine wave in a frequency doubler 81, limiting or clipping both half cycles of the resulting sine wave in a limiter 82 to obtain a rectangular wave and integrating this wave in an integrating circuit 83 to obtain the desired triangular wave 66. If sawtooth frequency modulation is preferred, the desired sawtooth wave may be obtained by passing the rectangular wave from the limiter 82 through a differentiating circuit 84 to obtain driving pulses which are applied to a sawtooth generator 86.

The graphs in Figs. 9 to 13 may aid further in understanding the invention. They are drawn for the case where a triangular frequency-modulation sweep is employed as shown by the graph 87. This graph represents both the signal radiated from the transmitter and the heterodyning signal that is supplied directly from the transmitter to the receiver. The received signal reflected from a certain fixed object or target is represented by the graph 88 while the received signal reflected from a certain moving target is represented by the graph 89.

The beat-frequency or difference signal produced by the heterodyne signal 87 and the fixed target signal 88 is shown by the graph 91 of Fig. 10. When this beat signal is delayed by the time $1/f_m$ and reversed in phase it appears as shown at 92 in Fig. 11. It is evident that the signal of Fig. 11 will balance out the signal 10 in the circuits previously described.

The beat-frequency signal produced by the heterodyne signal 87 and the moving target signal 89 is shown at 93 in Fig. 12. The graph 93 represents the signal that is obtained from a target that is moving at a speed such that the phase of the signal reverses at the beginning of each triangular frequency sweep. For instance, the signal 93 at the point B begins 180 degrees out of phase with respect to the same signal at the point A. This is the condition for maximum response from a moving target as will be apparent from an inspection of Fig. 13 where the graph 94 represents the beat-frequency signal 93 after it has been delayed by the time $1/f_m$ and reversed in phase. It is evident that the signals 93 and 94 will add in phase and will reinforce each other. Thus, there is produced an indication representing the moving target although there is no indication produced by the fixed target.

The effect of the target speed on the response produced at the receiver by signals reflected from the target is illustrated by the graph 96 in Fig. 14. It will be seen that the response increases from zero for a fixed target to maximum response at a certain target speed and then decreases with increase of target speed until the response is again zero, the shape of the graph being a half cycle of a sine wave. This response cycle repeats as the target speed continues to increase. While Fig. 14 shows that with certain designs of equipment it may be possible for an airplane to fly at such high speed that it cannot be detected by the equipment, this difficulty may be avoided to a large extent by proper design. Specifically, the first null point on the graph 96 (where the Doppler frequency equals 1) may be made to fall at a speed higher than it is possible for an airplane to fly. This can be done, particularly in the case of bombers. It may be noted that by "Doppler frequency" is meant the amount of frequency change caused by the Doppler effect. This is defined by the equation $$\frac{2S}{\lambda}$$

where S is the target speed and where $\lambda$ is the wave length of the signal.

Another way of avoiding the nulls or "dead spots" shown in Fig. 14 is to vary simultaneously the frequency modulation $f_m$ and the delay. This can be done conveniently where the delay and the frequency modulation are obtained by tape recording as in the system of Fig. 6. Any suitable means may be provided for cyclically varying the speed of rotation of the magnetic tapes 31 and 32. For example the motor speed may be varied or the motor may drive the tapes through some device that causes a cyclic speed variation. Such cyclic variations may be at the rate of one per second, for example.

I claim as my invention:

1. In a radio locator system, means for transmitting a periodically varied radio wave to both stationary and moving reflecting objects, means for simultaneously receiving the waves reflected from said stationary and moving objects, means for supplying a phase reference wave to said receiving means, means for comparing at said receiving means the phase of the reflected waves with respect to said phase reference wave, the waves reflected from the stationary objects recurring at said receiving means in an unchanging phase relation with respect to said reference wave and the waves reflected from the moving objects occurring at said receiving means in a continuously changing phase relation with respect to said reference wave, and means including said phase comparison means for substantially cancelling out the received waves of unchanging phase relation and for supplying only the received waves of changing phase relation to an indicator device for indicating the distance to a reflecting object.

2. In a radio locator system, means for transmitting a cyclically varied radio wave to both stationary and moving reflecting objects, means for receiving and demodulating the waves reflected from said objects, means for supplying a phase reference wave to said receiving means, means for comparing at said receiving means the phase of the reflected waves with respect to said phase reference wave, the waves reflected from the stationary objects recurring at said receiving means in an unchanging phase relation with respect to said reference wave and the waves reflected from the moving objects recurring at said receiving means in a continuously changing phase relation with respect to said reference wave, means including said phase comparison means for substantially cancelling out the received waves of unchanging phase relation and for supplying only the received waves of changing phase relation to an indicator device for indicating the distance to a reflecting object, said cancelling out means also including a delay device in a branch circuit of the receiving means for delaying the received waves.

3. In a radio locator system, means for cyclically frequency modulating a radio wave at a periodic rate of $f_m$, means for transmitting said modulated wave to stationary and moving reflecting objects, means for heterodyning said wave after reflection from said objects with a portion of said wave supplied directly from the transmitter whereby cyclically recurring beat-frequency signals are obtained, means for delaying said beat-frequency signals in one circuit path with respect to said beat-frequency signals in another circuit path by an amount substantially equal to $1/f_m$ times an integer, and means for combining said delayed signals with said undelayed signals in 180 degree phase relation with respect to each other whereby the signals produced by reflection from said stationary objects are substantially cancelled out.

4. In a radio locator system, means for cyclically frequency modulating a radio wave at a periodic rate of $f_m$, means for transmitting said modulated wave to stationary and moving reflecting objects, means for heterodyning said wave after reflection from said objects with a portion of said wave supplied directly from the transmitter whereby cyclically recurring beat-frequency signals are obtained, means for delaying said signals by an amount substantially equal to $1/f_m$ times an integer, and means for utilizing said delayed signals for cancelling out the signals produced by reflection from said stationary objects whereby only the waves reflected from said moving objects will produce an indication.

5. In a distance measuring system, means for cyclically frequency modulating a wave at a periodic rate of $f_m$, means for transmitting said modulated wave to stationary and moving reflecting objects, means for heterodyning said wave after reflection from said objects with a portion of said wave supplied directly from the transmitter whereby cyclically recurring beat-frequency signals are obtained, means for passing said beat-frequency signals through a first channel, means for delaying said signals in a second channel with respect to those passed through the first channel by an amount substantially equal to $1/f_m$ times an integer, and means for combining the signals from said two channels with the outputs from the two channels substantially 180 degrees out of phase with respect to each other and of substantially equal amplitude whereby the signals produced by reflection from said stationary objects are balanced out.

6. The method of distance measuring comprising cyclically frequency modulating a wave at a periodic rate of $f_m$, transmitting said modulated wave to stationary and moving reflecting objects, heterodyning said wave after reflection from said objects with a portion of said wave supplied directly from the transmitter whereby cyclically recurring beat-frequency signals are obtained, passing said beat-frequency signals through a first channel, delaying said signals in a second channel with respect to the signal output of the first channel by an amount substantially equal to $1/f_m$ times an integer, and combining the signal outputs from said two channels so that those signal components in the two channel outputs which are due to reflection from the stationary objects are substantially 180 degrees out of phase with respect to each other and are of substantially equal amplitude whereby the signals produced by reflection from stationary objects are balanced out and whereby only signals produced by reflection from a moving object produce an indication.

7. A distance measuring system comprising means for cyclically frequency modulating a wave at a periodic rate of $f_m$, means for transmitting said modulated wave to a reflecting object, a beat-frequency detector, means for supplying said wave to said receiver after reflection from said object, means for supplying a portion of said wave directly from the transmitter to said detector whereby a cyclically recurring beat-frequency signal is obtained, a first channel and a second channel for said beat-frequency signal, said second channel including an electro-mechanical delay means for delaying the signal passed through the second channel with respect to the signal passed through the first channel by an amount substantially equal to $1/f_m$ times an integer, means for combining the outputs of said channels in opposing phase relation and with substantially equal amplitudes whereby beat-frequency signals produced by reflections from fixed objects will be cancelled out and whereby only moving objects will be indicated, and means for maintaining synchronism between said delay means and said cyclic frequency modulation.

8. A distance measuring system comprising means for cyclically frequency modulating a wave at a periodic rate of $f_m$, means for transmitting said modulated wave to a reflecting object, a beat frequency detector, means for supplying said wave to said receiver after reflection from said object, means for supplying a portion of said wave directly from the transmitter to said detector whereby a cyclically recurring beat-frequency signal is obtained, a first channel and a second channel for said beat-frequency signal, said second channel including means for delaying the signal passed through the second channel with respect to the signal passed through the first channel by an amount substantially equal to $1/f_m$ times an integer, means for supplying the output of said second channel to said first channel with such phase relation and with such amplitude that the beat-frequency signals produced by reflections from fixed objects will be cancelled out whereby only moving objects will be indicated, means for maintaining synchronism between said delay means and said cyclic frequency modulation, and means for varying at a periodic rate both said delay and said cyclic frequency modulation.

9. The invention according to claim 8 wherein the delay means in said second channel comprises an electro-mechanical device having a moving tape upon which the beat-frequency signal is recorded, and wherein the means for cyclically frequency modulating said wave comprises a second electro-mechanical device that includes a tape upon which the frequency-modulating signal is recorded, and wherein the last means comprises means for changing the speed of said moving tapes at said periodic rate.

10. A distance measuring system comprising means for cyclically modulating a wave at a periodic rate of $f_m$, means for transmitting said modulated wave to a reflecting object, a beat-frequency detector, means for supplying said wave to said detector after reflection from said object, means for supplying a portion of said wave directly from the transmitter to said detector whereby a cyclically recurring beat-frequency signal is obtained, an amplifier for said beat-frequency signal, and a degenerative feedback circuit for said amplifier, said feedback circuit including means for introducing a delay substantially equal to $1/f_m$ times an integer.

11. A distance measuring system comprising means for cyclically frequency modulating a wave at a periodic rate of $f_m$, means for transmitting said modulated wave to a reflecting object, a beat-frequency detector, means for supplying said wave to said receiver after reflection from said object, means for supplying a portion of said wave directly from the transmitter to said detector whereby a cyclically recurring beat-frequency signal is obtained, an amplifier for said beat-frequency signal, a delay network which provides a delay substantially equal to $1/f_m$ times an integer, and means for coupling the output circuit of said amplifier to the input circuit of said amplifier through said delay network to introduce degeneration of said beat-frequency signal when said object is stationary.

12. In a radio locator system, means for cyclically frequency modulating a radio wave at a periodic rate, means for transmitting said modulated wave to both stationary and moving reflecting objects, means for receiving the waves reflected from said objects, the waves reflected from the stationary objects recurring at said receiving means in an unchanging phase relation and the waves reflected from the moving objects recurring at said receiving means in a continuously changing phase relation, said receiving means comprising means for heterodyning the reflected waves with a portion of said wave supplied from the transmitter whereby cyclically recurring beat-frequency signals are obtained, means for substantially cancelling out the received waves of unchanging phase relation and for supplying the received waves of changing phase relation to an indicator device for indicating the distance to a reflecting object.

13. The invention according to claim 12 wherein said cancelling out means includes a delay device in a branch path of the receiving means for delaying the received waves.

ROYDEN C. SANDERS, Jr.

REFERENCES CITED

The following references are of record in the file of this patent:

UNITED STATES PATENTS

| Number | Name | Date |
|---|---|---|
| 1,590,635 | McCaa | June 29, 1926 |
| 2,134,716 | Gunn | Nov. 1, 1938 |